United States Patent [19]

Wang

[11] Patent Number: 5,394,233

[45] Date of Patent: Feb. 28, 1995

[54] APPARATUS FOR MEASURING HIGH FREQUENCY VIBRATION, MOTION, OR DISPLACEMENT

[76] Inventor: Charles P. Wang, 28509 Seamont Dr., Rancho Palos Verdes, Calif. 90274

[21] Appl. No.: 43,367

[22] Filed: Apr. 6, 1993

[51] Int. Cl.[6] .......... G01C 3/00; G01C 3/08; G01B 9/02

[52] U.S. Cl. ............. 356/5.01; 356/28.5; 356/4.09; 73/657

[58] Field of Search ............ 356/5, 28.5, 4.5, 141, 356/152; 73/657

[56] References Cited

U.S. PATENT DOCUMENTS

| | | | |
|---|---|---|---|
| 4,447,149 | 5/1984 | Marcus et al. | 356/5 |
| 4,466,738 | 8/1984 | Huang et al. | 356/4.5 |
| 4,572,662 | 2/1986 | Silverman | 356/5 |
| 4,834,531 | 5/1989 | Ward | 356/5 |
| 4,990,791 | 2/1991 | Nishi | 356/28.5 |
| 5,164,784 | 11/1992 | Waggoner | 356/28.5 |
| 5,267,011 | 11/1993 | Callender | 356/28.5 |

*Primary Examiner*—Stephen C. Buczinski
*Attorney, Agent, or Firm*—Macro-Search Corp.

[57] ABSTRACT

Apparati and methods are disclosed for detecting vibrations, displacements and motions of a remote surface with high sensitivity, high frequency response and high accuracy using a laser beam with optical modulation, optical hetrodyning and phase detection. High speed digital signal processing is used. Shared aperture design is employed for utilization of a flat target, double-pass design for large lateral movement tolerance with high resolution, and dual target design for detection of displacement as well as angular changes in vibrational motion.

5 Claims, 4 Drawing Sheets

APPARATUS FOR MEASURING HIGH FREQUENCY VIBRATION, MOTION, OR DISPLACEMENT

FIELD OF THE INVENTION

The invention relates generally to apparati for the measurement of mechanical vibrations, which includes displacement, velocity, and acceleration, and particularly to the accurate measurement of high frequency vibrations in a remote object through optical techniques.

BACKGROUND OF THE INVENTION

Devices for measuring mechanical vibrations include the accelerometer, linear variable differential transformer (LDVT), laser doppler velocimeter (LDV), vibrometer, laser interferometer and others, as well as combinations of these. The accelerometer measures vibrations directly, being directly mounted upon the subject. Drawbacks include limited sensitivity and accuracy, the need for frequent calibration and the fact that its mass may perturb the measurement. The LDVT in measuring the relative displacement of vibration, has a short measurement range and it is highly non-linear. The LDV measures the velocity of a vibrating surface, is non-contacting but the signal-to-noise ratio is poor. The laser interferometer is non-contacting but high resolution and high speed cannot be obtained simultaneously so that it is useful only for low frequencies. None of-the prior art devices provide the ideal performance of remote sensing, high resolution, sensitivity and accuracy, good signal-to-noise ratio and being usable in both low and high vibrational frequency applications.

It is noted that most prior art on the noncontact vibration measurement such as Foster (J. V. Foster "A Laser Device for Remote Vibration Measurement", IEEE Trans Aerospace and Electronic Systems, AES3(2), p.154, Mar. 1967), Monchalin (U.S. Pat. No. 4,633,715, 1/1987) and Khanna (U.S. Pat. No. 4,834,111, 5/1989), are based on the Laser Doppler Velocimetry technology which is quite different from the Laser Doppler Displacement Meter (LDDM) technology claimed here.

Even though both use interferometers, optical heterodyne, AO-modulation, photodetector, etc., the basic concept, measurement and its applications are quite different.

Briefly, the LDV is based on the Doppler frequency shift, $$fD = fL(2V/c) \quad (1)$$

where fD is the Doppler frequency shift, fL is the laser frequency, V is the target velocity parallel to the laser beam, and c is the speed of light. The velocity can be determined by measuring the frequency shift. Any target with a rough surface or a diffusive reflector will scatter light back with the Doppler frequency shift caused by the target velocity. The electromagnetic field at the detector is the sum of light scattered by many scatter centers. As shown by Wang (C. P. Wang, "A unified Analysis on Laser Doppler Velocimeter", J. Phys. E, 5. p. 763,1972)

$$E(t) = \text{Sum}(p=1 \ldots n) \, Ap \, \exp\{-i2pi(fL+fD) \, t + i \, Op\} \quad (2)$$

where E(t) is the electromagnetic field at the detector from n scatter centers, Ap is the amplitude, fL is the laser frequency, fD is the Doppler frequency shift and Op is the phase angle. After mixing with a local oscillator on a square-law detector, the output spectral density has a term with the Doppler frequency shift fD and certain broadening. Because the light is scattered back, there is Doppler ambiguity (see C. P. Wang, "Effect of Doppler ambiguity on the measurement of turbulence spectra by laser Doppler Velocimeter, Appl. Phys. Lett, 22(4), p. 154, February 1973) which broadens the frequency shift fD and limits the detection to be above a certain minimum velocity of the target. Hence for LDV the signal-to-noise ratio is low and there is a minimum target velocity.

The LDDM technique (see C. P. Wang, U.S. Pat. 4,715,706, 12/19/87) is based on the same Doppler frequency shift, but integrates the frequency to obtain the relation between the phase and the displacement:

$$(O/2pi) = (fL/c)*(x - xO) \quad (3)$$

where O is the phase angle, x is the position and xO is the initial position. As shown above, in the LDV, the phase angles are lost after summing over many scatter centers. Hence, for the LDDM, a target with a flat-mirror or a specular reflector is needed. Using the same notation as in Wang's patent, the electromagnetic field at the detector is:

$$V4(r,t) = a4(r,t) \exp i\{(wO + wD) \, t + O4\} \quad (4)$$

$$V2(r,t) = a2(r,t) \exp i\{(wO+) \, t + O2\} \quad (5)$$

Where V4 is the reflected field, V2 is the reference or local oscillator field, a4 and a2 are amplitudes, O4 and O2 are phase angles, wO is the laser frequency in rad/sec, is the AO-modulator frequency, wD is the Doppler frequency shift, r is the position and t is the time. The output from the square-law detector is then:

$$\begin{aligned} Ip(rp,t) &= A/T \int_{t-T\,rp-d/2}^{t\,rp+d/2} dt |V2(r,t) + V4(r,t)| 2pi \, rdV \\ &= B\cos[(w + wD)t + O] \end{aligned} \quad (6), (7)$$

where rp is the position of the detector, T is the averaging time, d is the detector diameter and A, B and O are constants. Integrating the Doppler frequency shift, we obtain:

$$(O/2pi) = \int_0^t wDdt \quad (8)$$

Hence, using a phase-demodulator circuit, the phase O can be measured.

In summary, the major differences between the LDV and the LDDM are as follows:

1) Signal-to-noise ratio, (S/N)
   LDV: Low, requiring averaging over time
   LDDM: High, requiring no averaging
2) Target
   LDV: Any scattering surface or a diffusive reflector
   LDDM: Flat mirror or specular reflector
3) Minimum Velocity
   LDV: Target must move at a minimum velocity LDDM: No minimum velocity By reference, the present invention incorporates U.S. Pat. No. 4,715,706 issued on Dec. 29, 1987 to Charles P. Wang, the present inventor. The current invention builds upon the technological base established in the 1987 patent, said patent comprising an apparatus for the precise measurement of the displacement of a moving cooperative target from a reference position, traveling over a distance of several meters with a measurement accuracy of a fraction of a millimeter. The doppler phase shift of a reflected laser beam is determined to obtain a precise measurement of the displacement of the target with respect to a prior determined reference position.

SUMMARY OF THE INVENTION

The invention teaches a method for optimizing the optical acquisition of data for measuring the vibration and displacement of a remote body. The technique provides the ideal performance lacking in prior art devices including remote sensing, high resolution, sensitivity and accuracy, good signal-to-noise ratio, and usefulness in both low and high frequency applications. A laser generated beam is used as means for detecting vibration in the remote body. The beam is diffracted and frequency shifted to act as a reference beam. Both signals are combined for detection. A single aperture method is employed to permit the use of a plane target reflector thus minimizing the mass of the target reflector and its impact upon the vibrating body.

A beam expander is used in a technique permitting minimum disturbance of the vibrating body by employing a lightweight and physically small, planar mirror. The beam expander and shared aperture design permit signal processing with the smallest possible target reflector. Double pass optical arrangement is employed to improve resolution and ease alignment restrictions. In an alternate configuration, a double-pass design is used together with a large retro-reflector target to achieve a large tolerance for lateral movement and rotation of the target. A dual-beam design which includes two output laser beams and two photodetectors achieves the detection of both linear and angular displacement simultaneously The invention apparatus provides a unique method for optical measurement of vibration, displacement or other mechanical deflection of a target at high frequency. The technique uses optical modulation and heterodyning for phase detection of frequency shifts in a measurement laser beam as compared with a reference beam. The result provides information about displacement changes which can be differentiated once for velocity and twice for acceleration information. Therefore it is imperative to have a large signal to noise ratio and high resolution.

As shown by the referenced U.S. patent to Wang, with respect to the Doppler effect, the displacement of a retro-reflector target can be expressed as:

$$X = [C/2F] * [N + PHI/2PI]$$

where C is the speed of light, F is the laser frequency, N is the number of cycles (2 pi's), and PHI is the measured phase. Based upon the Wang apparatus both PHI and N can be measured. In the current invention an 8-bit counter is used to record N and an 8-bit A/D converter is used to digitize PHI. Each data point is two bytes, one for N and the other for PHI. The data is recorded into solid state memory at a data rate of up to 800,000 points per second. The data is then read by a low cost general purpose ze for use with microcomputer and common magnetic media. The data can be plotted and viewed on a monitor as displacement, velocity or acceleration information, and can be further processed to obtain power spectra density, shock response spectra or other results. Because the invention has the ability to accept high data rate streams and has resolution capabilities in the range of one nanometer, it can measure velocities in the range of two meters per second and mechanical vibrations, both transient and continuous waves, up to 100 kHz.

Other features and advantages of the present invention will become apparent from the following more detailed description, taken in conjunction with the accompanying drawings, which illustrate, by way of example, the principles of the invention.

DESCRIPTION OF THE DRAWINGS

The accompanying drawings illustrate the invention. In such drawings.

DETAILED DESCRIPTION OF THE PREFERRED EMBODIMENT

Figure 1:
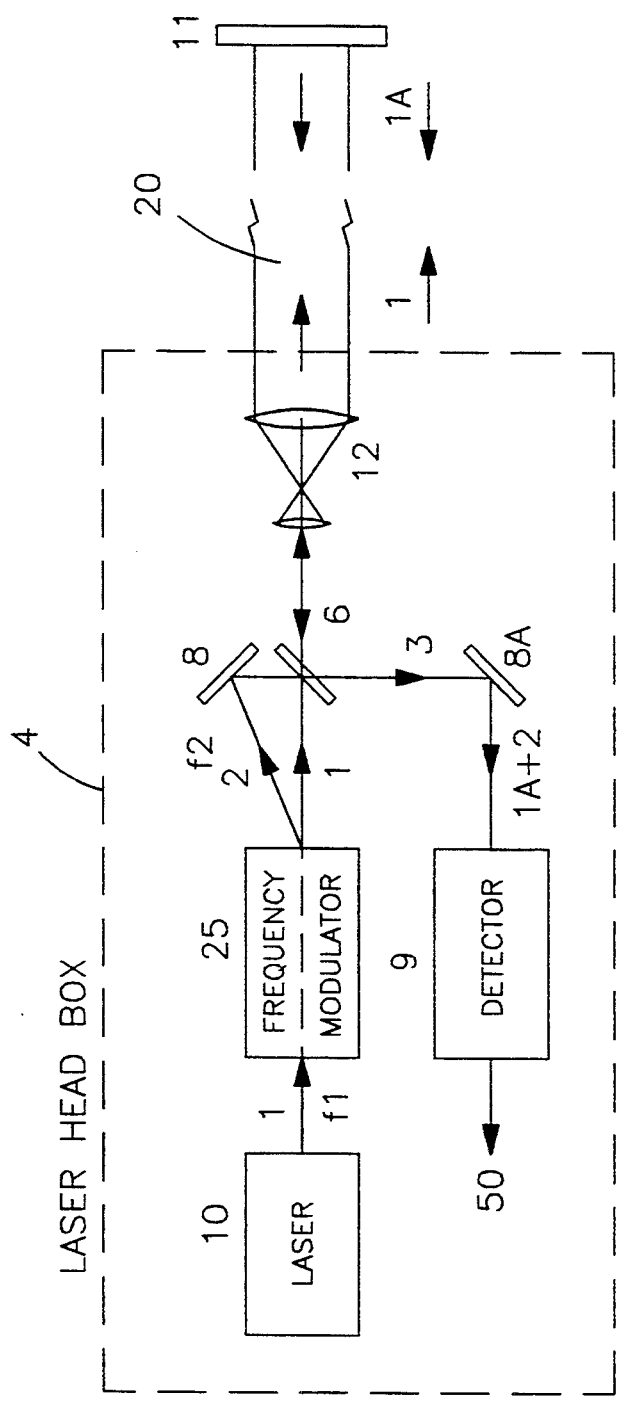
FIG. 1 is block diagram of the invention as used for detecting a single degree of freedom of the vibration or motion of a remote target.

FIG. 1 illustrates an apparatus for detecting vibration or motion of a first reflective target 11. The apparatus comprises a laser source 10, which may be any readily available laser such as a 1 mw HeNe laser or a cw semiconductor diode laser, for producing a source light beam 1 of frequency f1. The source beam 1 strikes the reflective target 11 and returns as reflected beam 1A; beams 1 and 1A sharing a first common path 20. After leaving laser 10, source beam 1 enters a frequency modulator 25, such as an acoustic-optical modulator, thereby producing a diffracted reference beam 2 of frequency f2, diffracted from the source beam 1, where f2 is shifted relative to frequency f1 of the source. A reflector 8 steers reference beam 2 to intersect reflected beam 1A at first beam combiner 6, whereby the first combined beam 3 (1A+2) is directed into first detector 9 by second reflector 8A. In order to enhance the signal-to-noise ratio, assure acquisition of the first target 11 by the source beam 1, and reduce the required alignment precision, first beam expander 12 may be used to broaden source beam 1.

Figure 2:
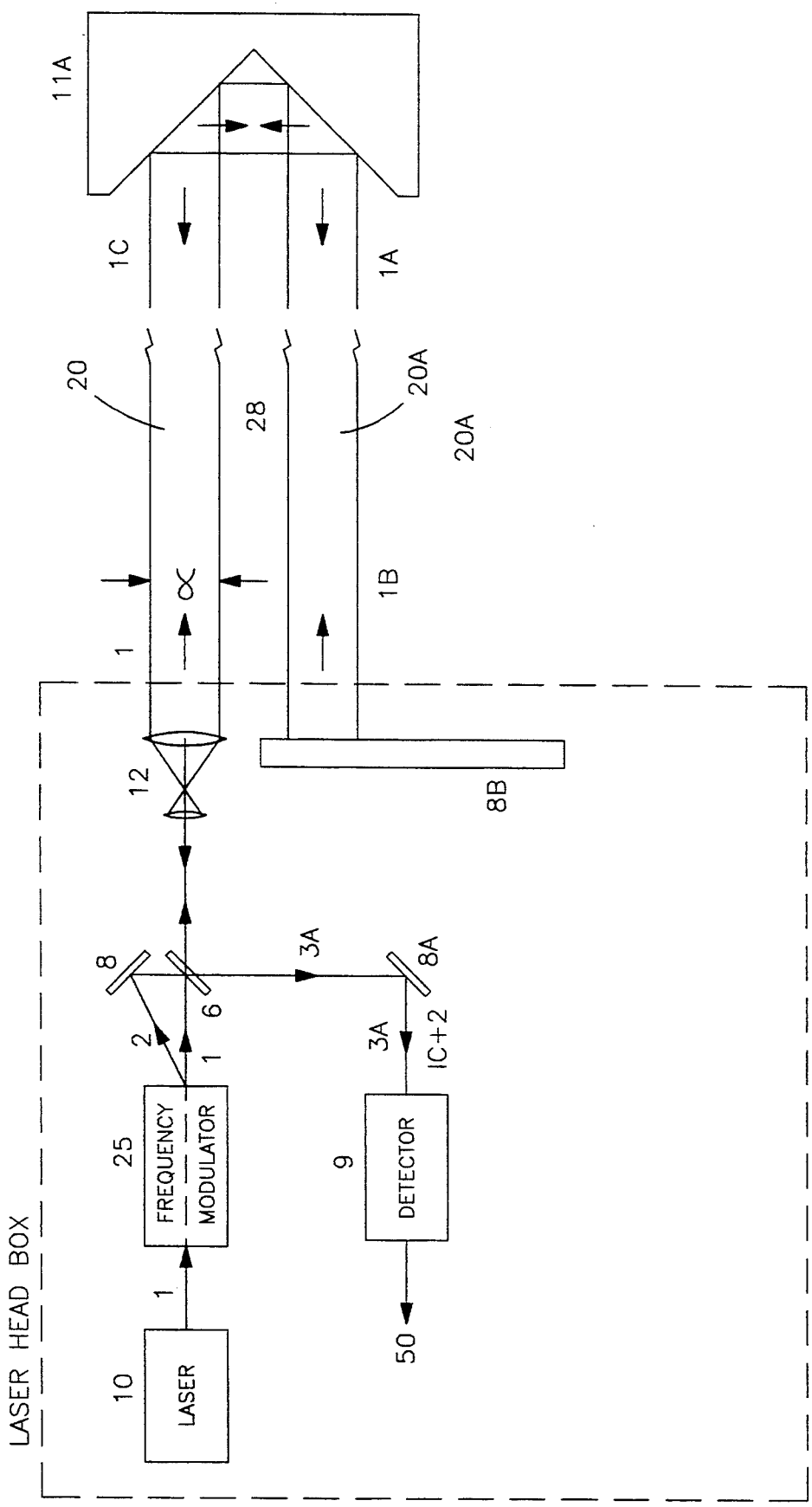
FIG. 2 is a block diagram of the invention of FIG. 1 but using a corner cube reflector, plane reflector combination to double the measurement path length.

FIG. 2 describes an alternate embodiment similar to that of FIG. 1 but with large tolerance for both lateral and angular movement of the second reflective target 11A. For the setup shown in FIG. 1, either a flat mirror or a corner-cube may be used as the target 11. Although the use of a flat-mirror as a target is insensitive to lateral movement, it is very sensitive to the rotation of the target. The corner cube as a target is insensitive to rotation, but is very sensitive to lateral movement. The arrangement in FIG. 2 provides tolerance, simultaneously, for both relatively large lateral target movement, on the order of one-half the size of the third reflector 8B, which is preferrably a flat mirror, as well as relatively large rotational angles, but typically less then 30 degrees. In this case the second reflective target 11A is a corner cube set approximately in line with the source beam 1. The third reflector 8B is preferrably an extended plane reflector mounted opposite the second reflective target 11A and having a fixed angular relationship with respect to the laser source 10, reflector 8B being positioned to receive the reflected beam 1A from the target 11A, producing second reflected beam 1B projected back along the second common path 20A of the reflected beam 1A, to be again reflected by the target 11A producing third reflected beam 1C passing back along the first common path 20, whereby the total path length of beams 1, 1A, 1B and 1C is approximately doubled with respect to the optical path of the apparatus of FIG. 1. Reflector 8B is typically larger than the beam width (alpha) in order to accommodate significant misalignment and movement of target 11A. As in FIG. 1, reflector 8 steers reference beam 2 into intersection with third reflected beam 1C at combiner 6, whereby the combined beam 3A (1C+2) is directed into first detector 9 by reflector 8A.

Figure 3:
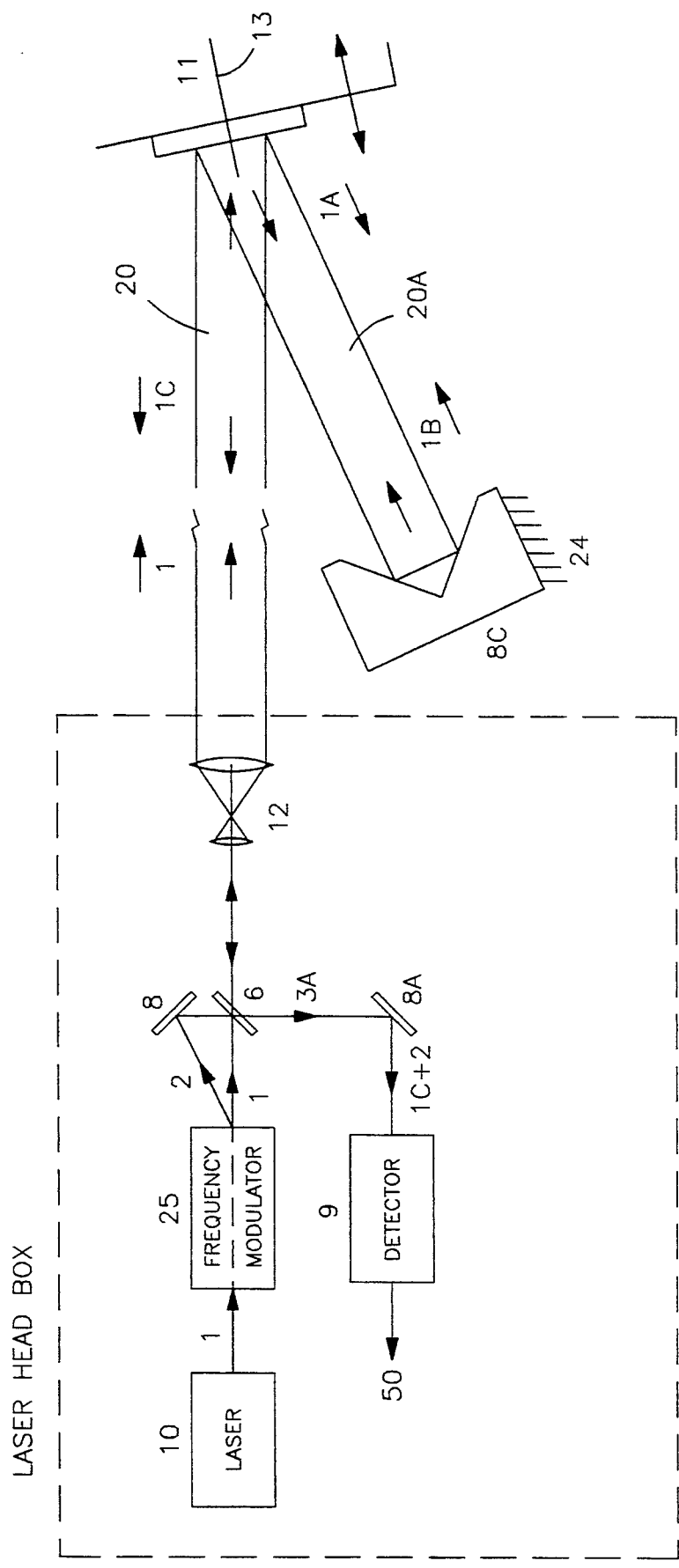
FIG. 3 is a block diagram of the invention of FIG. 1 but using a corner cube reflector, planar reflector combination in an off angle arrangement to double the measurement path length.

FIG. 3 describes an alternate embodiment of the invention similar to that of FIG. 2. The requirement for the target 11 of FIG. 1 is that it has to be typically perpendicular to beam 1 within about 30 arcsec, which is very difficult to achieve in the field. It was noted that the lateral tolerance of the return beam is about ½ beam diameter. The purpose of the arrangement in FIG. 3 is to trade lateral tolerance for angular tolerance. The angular tolerance of target 11 becomes a few degrees instead of a few arcsec. Hence it makes the use of a flat-mirror in the field practical except that the normal 13 to reflective target 11 is not parallel to the path of source light beam 1. The fourth reflector 8C is a corner cube reflector having a fixed angular relationship with the laser 10. The corner cube is positioned to receive, on axis, first reflected beam 1A from the target 11, thereby generating the second reflected beam 1B which is reflected back along the second common path 20A, to target 11, generating third reflected beam 1C in common path 20 in the opposite direction of source beam 1, whereby the total path length of beams 1, 1A, 1B and 1C is approximately doubled with respect to the optical path of the apparatus of FIG. 1.

Figure 4:
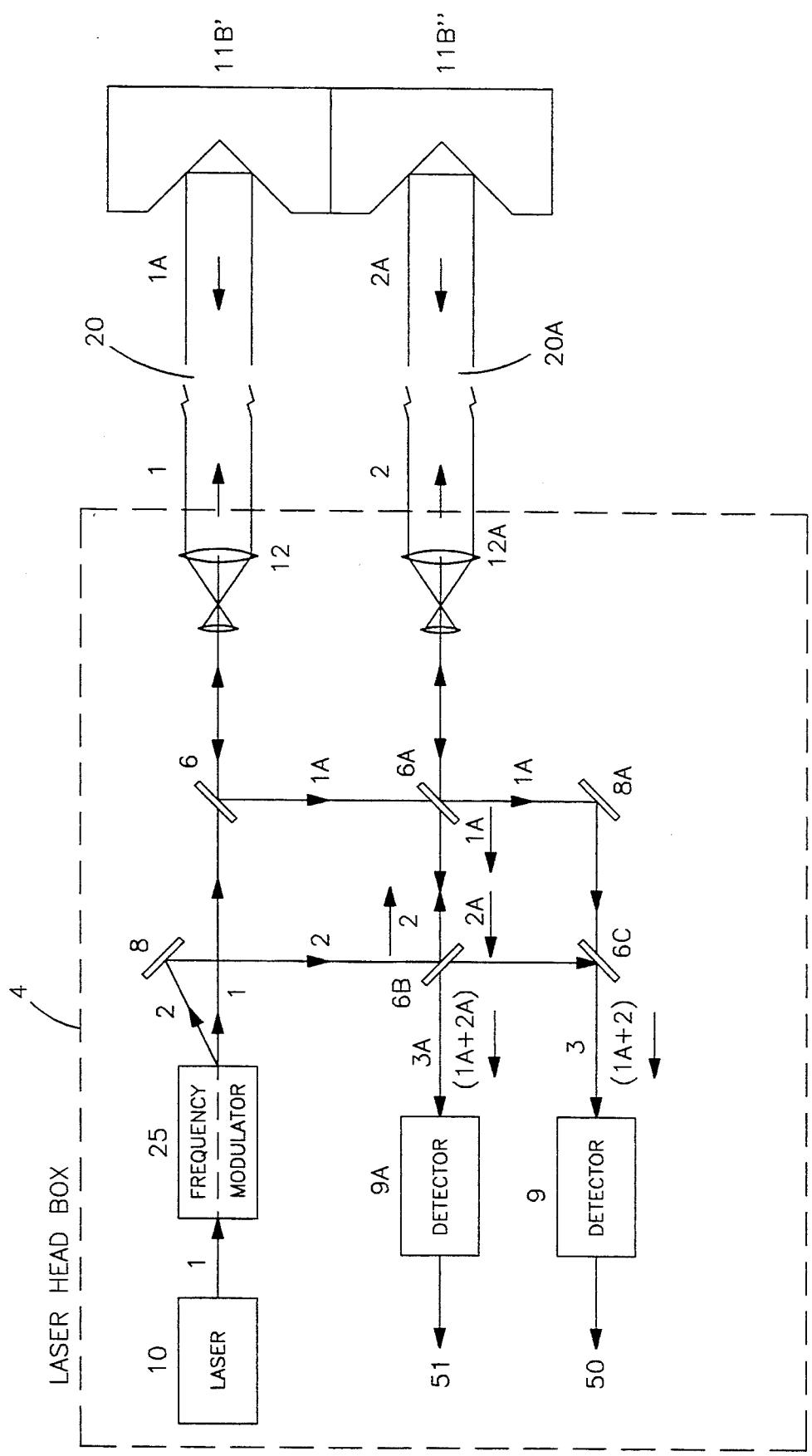
FIG. 4 is block diagram of the invention as used for detecting two degrees of freedom of the vibration of a remote target.

FIG. 4 describes an alternate embodiment similar, in part, to that of FIG. 1. Based on the same concept as shown in FIG. 1, beam 1 strikes the third reflective target 11B', typically a composite target made up of two corner cube reflectors 11B' and 11B", and returns as first reflected beam 1A, where it is combined with first reference beam 2 at the fourth beam combiner 6c before entering first detector 9. The output of detector 9 contains the information on the displacement of the target 11B', 11B". Additionally, a portion of the first reference beam 2 is directed to target 11B" by beam splitter 7, is returned as second reflected beam 2A to be combined first reflected beam 1A at second beam combiner 6A and is then directed into second detector 9A. The output of the second detector 9A contains the information on the displacement of the third target 11B', 11B".

The first combined beam 3 (1A+2) contains the doppler frequency shift information from motion of the third reflective target 11B', 11B". The output 50 therefore contains information on the displacement of the third target. The second combined beam 3A (1A+2A) is detected by second detector 9A so that output 51 contains the information on the difference of the displacement of the two corner cubes of the third reflective target 11B', 11B". This is proportional to the rotation or angular displacement of the target. Hence both linear displacement (detector 9) and angular displacement (detector 9A) can be measured simultaneously.

The electrical signal outputs 50, 51 of the detectors are amplified and introduced to a phase demodulator. The detection and signal processing scheme is disclosed in the referenced 1987 patent to Wang. The modulator 25 serves three functions including the generating and frequency shifting of the reference beam 2 and isolating the laser cavity from any reflected or stray laser light. This later function prevents laser instability and permits the use of the shared aperture design employed, whereby both the source/reference light beams and the target reflected light beams travel on the same path. The laser beams are not polarized so reflectors may be first surface devices and all beam handling components including beam splitters and combiners can be very small in size.

For vibration measurement it is important that the vibrating reflective target be as small as possible, and that it be attached rigidly to the vibrating body. These constraints are required so that the resonance frequency of the mirror-system be much higher than the vibration frequency to be measured. Typically the resonance frequency F (r) can be expressed as:

$$F(r) = 1/2pi^* \ SQR(k/m)$$

where k is the equivalent spring constant and m is the mass of the mirror-system. It is clear from this equation that a large spring constant is necessary or that the reflective target have a very small mass in order to achieve high resonance frequency. This is achieved in the configuration of FIG. 1 where the reflective target can be a very lightweight mirror or a polised specular reflective surface on the vibrating body itself.

FIG. 2 is a double pass light beam arrangement used where large lateral alignment tolerances must be tolerated. Here an extended plane reflector 8B is properly aligned and fixed to the laser head box 4. The source beam 1 is reflected by the reflector 11A to the extended plane reflector 8B. Beam 1B is passed through exactly the same path but in the reverse direction as beam 1A. Although the alignment of the reflector 8B is critical, it is prealigned and fixed to the laser head 4.

The alignment requirements of the reflector 11A, in this case, are very much relaxed. The retro-reflector can be rotated up to 30 degrees, limited only by its size, and can be laterally moved up to a distance of (D-d)/2, where D is the diameter of the flat mirror and d is the laser beam diameter, without loss of alignment. Because the laser beam is reflected by target 11A twice, displacement changes produces twice the phase shift when compared to single pass. Hence resolution is doubled. It is noted that the total displacement of a flat reflector is limited due to narrow alignment limits. The tolerence for displacement is a function of measurement distance, off-angle magnitude and other geometric considerations specific to the application. A typical setting might have a distance of 50 cm and an angle of 2-3 degrees, whereby the displacement range of a flat mirror is a few centimeters which is more than enough for the measurement of vibrations.

The advantages of the double-pass arrangement shown in FIG. 3 are the ability to use a thin and light weight flat mirror for the reflective target instead of a more massive corner cube, the alignment tolerance is much larger and the resolution is doubled due to the double pass of the light beam.

The embodiment shown in FIG. 4 provides a method for measuring both pitch (yaw), and displacement simultaneously. Detector 9 measures the phase shift due to the displacement of the target 11A while detector 9A measures the relative phase shift between the retroreflectors 11B' and 11B".

In practical vibration measurement, it is important to record the data at a high date rate. The techniques of the present invention permit the use of relatively low cost, common microcomputer equipment and interface circuits capable of 800,000 bits/sec.

What is claimed is:

1. Apparatus for detecting the motion or displacement of a specularly reflective corner cube target comprising:

a stationery laser for producing a highly collimated source light beam, the corner cube being set approximately in line therewith, the beam having a source frequency and a source phase angle, the source beam striking the moving specularly reflective target and returning as a low noise reflected beam having a new frequency and a new phase angle differing from the source phase angle, the difference between said phase angle correspondingly related to the position of the target;

A means for producing a reference beam, refracted from the source beam and having a reference frequency, said reference frequency being shifted by a known amount, relative to the source frequency, said reference beam projected to cross the reflected beam, said means for producing a reference beam additionally acting to block the reflected beam from entering the laser thereby preventing laser instability;

a means for combining the reflected and reference beams at said crossing to produce a combined beam having a phase angle related to the position of the target;

a photodetector positioned in the path of the combined beam for sensing the modulation frequency of the combination for detecting phase shifts due to the change in position of the reflective target and for producing a related electrical signal output:

and further including a planar specularly reflective reflector mounted opposite the corner cube and having a fixed angular relationship with the laser, the planar reflector positioned to receive, the source beam as reflected from the corner cube, thereby generating a twice reflected beam projected back along the path of the reflected beam, so that the total path length of the source and reflected beams is approximately doubled and the resolution of measurement is thereby doubled, and phase information is maintained in the reflected beam, whereby rotational and lateral motions of the target have little effect on the position of the reflected beam.

2. Apparatus for detecting the motion or displacement of a specularly reflective target having a planar specularly reflective surface comprising:

a stationery laser for producing a highly collimated source light beam, a normal to the specularly reflective surface being non-coincident with the path of the source beam, the beam having a source frequency and a source phase angle, the source beam striking the moving specularly reflective target and returning as a low noise reflected beam having a new frequency and a new phase angle differing from the source phase angle, the difference between said phase angle correspondingly related to the position of the target;

A means for producing a reference beam, refracted from the source beam and having a reference frequency, said reference frequency being shifted by a known amount, relative to the source frequency, said reference beam projected to cross the reflected beam, said means for producing a reference beam additionally acting to block the reflected beam from entering the laser thereby preventing laser instability;

a means for combining the reflected and reference beams at said crossing to produce a combined beam having a phase angle related to the position of the target;

a photodetector positioned in the path of the combined beam for sensing the modulation frequency of the combination for detecting phase shifts due to the change in position of the reflective target and for producing a related electrical signal output;

and further including a corner cube reflector mounted opposite the corner cube and having a fixed angular relationship with the laser, the corner cube positioned to receive the source beam as reflected from the planar reflective surface, thereby generating a reflected beam projected back along the path of the reflected beam, so that the total path length of the source and reflected beams is approximately doubled, providing a doubling of the resolution of measuremen, and phase information in the reflected beam is maintained, whereby alignment of the apparatus requires only to intercept the source beam with the corner cube.

3. Apparatus for simultaneously detecting the linear displacement and the angular displacement of a moving specularly reflective compound target consisting of a pair of commonly mounted corner cubes, said apparatus comprising:

a laser for producing a highly collimated source light beam having a source frequency and source phase angle, the source beam striking a first of the pair of commonly mounted corner cubes and returning as a first reflected beam;

a means for producing a reference beam, refracted from the source beam and having a reference frequency, said reference frequency being shifted, relative to the source frequency, said producing means additionally acting to block the first reflected beam from entering the laser, the reference beam striking a second of the pair of commonly mounted corner cubes and returning as a second reflected beam;

a means for combining the first reflected beam with the second reflected beam into a first combined beam for containing phase angle information on the difference in displacement between the first and the second corner cubes for evaluation of the angular displacement of the compound target;

a means for combining the first reflected beam with the reference beam into a second combined beam for containing phase angle information on the displacement of the compound target;

a pair of detecting means for respectively detecting the magnitudes of the first and second combined beams to provide electrical signals containing angular and linear displacement information of the motion of the compound target.

4. The apparatus of claim 3 further including beam expanding means for intercepting the source and reference beams, to broaden same so that alignment precision of said apparatus is reduced.

5. A method for simultaneously detecting the linear displacement and the angular displacement of a specularly reflective compound target consisting of a pair of commonly mounted corner cubes, the method comprising the steps of:

a) providing a stationery laser, a means for producing a reference light beam, a pair of means for combining light beams, a pair of means for splitting a light beam and a pair of photodetectors;

b) projecting a highly collimated source light beam from the laser, the source beam having a source beam frequency and phase angle, to the means to produce a reference light beam to produce a reference light beam having a reference beam frequency and phase angle shifted from the source beam frequency and phase angle by a known amount;

c) projecting the source light beam from the producing means to strike one of the corner cubes to produce a reflected source light beam having a frequency and phase angle different from the source beam frequency and phase angle by an amount related to the position of the one corner cube;

d) splitting the reflected source beam in one of the splitting means to produce a first and a second reflected source beams;

e) splitting the reference beam in the other of the splitting means to produce a first and a second reference beams;

f) combining the first reflected source beam with the first reference beam in one of the combining means to produce a first combined beam having a frequency and phase angle related to the position of the one of the corner cubes;

g) detecting the first combined beam in one of the photodetectors to produce a first electrical signal containing target linear displacement information;

h) projecting the second reference beam to strike the other of the corner cubes to produce a reflected reference beam having a frequency and phase angle different from the reference beam frequency and phase angle by an amount related to the position of the other of the corner cubes;

i) combining the second reflected source beam with the reflected reference beam in the other of the combining means to produce a second combined beam having a frequency and phase angle related to the angular displacement of the target;

j) detecting the second combined beam in the other of the photodetectors to produce a second electrical signal output containing target angular displacement information.

* * * * *